United States Patent

Glasser et al.

[15] 3,655,404
[45] Apr. 11, 1972

[54] SHELF STABLE FRENCH TOAST

[72] Inventors: George Glasser, Ossining, N.Y.; Frank Hollis, Hillsdale, N.J.; Milton Kaplow, White Plains, N.Y.

[73] Assignee: General Foods Corporation, White Plains, N.Y.

[22] Filed: Apr. 3, 1969

[21] Appl. No.: 813,300

[52] U.S. Cl. ................................99/92, 99/150 R, 99/142
[51] Int. Cl. .......................................................A21d 13/08
[58] Field of Search ....................99/86, 92, 150 R, 172, 144

[56] References Cited

UNITED STATES PATENTS 3,021,219  2/1962  Melnick ...........................99/150 UX

OTHER PUBLICATIONS

Woman's Day Encyclopedia of Cookery, " French Toast," Vol. 11, page 1826 New York 1966.

*Primary Examiner*—Raymond N. Jones
*Assistant Examiner*—James R. Hoffman
*Attorney*—Thomas V. Sullivan, Bruno P. Struzzi and Jerome J. Norris

[57] ABSTRACT

French toast having a moisture content between 14 and 32 percent and an $A_w$ between 0.80 and 0.90 is prepared by saturating bread with an emulsion containing 15 to 35 percent water soluble sugar solids, 3–15 percent edible polyhydric alcohol and an effective level of antimycotic to prevent mold growth. The product may be stored for long periods of time without the need of sterilization or refrigeration.

6 Claims, No Drawings

SHELF STABLE FRENCH TOAST

This invention relates to French toast which is shelf stable against microorganic decomposition to the extent that the necessity of further treatments to provide bacteriostasis and protection against development of molds is avoided. The invention further relates to new and improved processes for preparing French toast products complete in flavor, texture and appearance as compared to freshly prepared French toast and which require neither refrigeration nor sterilization in order to impart stability against spoilage to the products.

The invention relates even further to emulsions containing low cost, high quality shelf stable syrup, which produces a maple-like aroma and a maple taste when grilled on bread to make French toast.

The concept of intermediate moisture food products, that is, products having a moisture content in excess of 10 percent and substantially below 75 percent, is set forth in U.S. Pat. No. 3,202,514. In general, an increase in the moisture level of many foods will increase the palatability thereof, however, any significant elevation of the moisture level of such foods above 10 percent leads to microbiological decomposition unless such foods are packaged in a hermetically sealed container and commercially sterilized or maintained in a frozen or refrigerated state throughout the period of distribution and storage by the consumer. These packaging or preservation methods are expensive and not convenient to the consumer under all anticipated conditions of use.

It is an object of this invention to provide a moist fully cooked French toast, complete in flavor, texture and appearance as freshly prepared French toast, and having a high degree of palatability such that the consumer receives it favorably.

A further object of this invention is to provide a moist fully cooked French toast, complete in flavor, texture and appearance as freshly prepared French toast, and having microbiological stability such that it can be packaged using conventional moisture protective wrapping materials while eliminating the necessity for hot packing or thermal sterilization incident to packaging and can be stored for extended periods of time under non-refrigerated conditions without incurring any significant risk of microbiological spoilage, of recontamination or of product discoloration; having the property of lending itself to simple processing under ambient temperatures without the necessity for packaging in such a manner as to prevent occlusion of air and assuring intimate contact of the product with the packaging material.

A still further object of this invention is to provide new and improved processes of preparing French toast products in such a manner that neither refrigeration nor sterilization is required in order to impart stability against spoilage to the products.

A further object even still is to provide emulsions containing low cost, high quality shelf stable syrup, which produces a maple-like aroma and a maple taste when grilled on bread to make French toast. The term "French toast" as it is employed in the present context is to be understood as meaning any kind or type of bread which has been substantially saturated with a mixture comprising whole egg, egg whites, egg yolks, or combinations thereof, and toasted or grilled.

In general, the shelf stable French toast products of this invention are formulated by incorporating emulsions containing syrups, polyhydric alcohols, edible oils, dried egg whites and/or yolks, non-fat milk solids and other additives into bread, and grilling the bread until a golden brown color develops on both sides. The product is then allowed to cool to room temperature and is then packaged.

The emulsion employed to infuse the bread in this invention is formulated on the principles of Aw, that is, the ability of the soluble solids of the emulsion to limit the amount of "free" water available to bacteria; the bacteria's inability to survive this condition; and the subsequent shelf stability or product stability obtained by virtue of this condition.

The Aw value is a direct measure of water vapor which is a function of unbound water. It is determined by dividing the moles of water plus moles of soluble solids into the moles of water. The lower the Aw value, the more stable the French toast product against microbiological decomposition, e.g. 0.80 Aw in a product indicates more stability than 0.90 Aw in a similar type product. Some of the ingredients employed in the Aw emulsion of this invention cannot be directly calculated for their effects on Aw because of the unknown quantities of soluble solids which they contain. Therefore, samples of French toast measured electronically for Aw are usually found to have a somewhat lower Aw value as compared to those calculated directly.

To compute the complete Aw, the Aw lowering of the calculated ingredients are added together and subtracted from "1", "1" being equivalent to 100 percent water vapor or maximum water vapor which would be produced if none of the free water were bound by soluble solids. Thus a calculated Aw of 0.96 indicates an Aw lowering of 0.04.

The relative weight percent of water soluble solids to the moisture content of the French toast, when initially incorporated into the French toast during its manufacture and preparatory to packaging determines the ultimate functionality of the solids in providing the requisite bacteriostatic effect. Usually the level of moisture will range from 14 percent to 32 percent. The level of water soluble solids may be varied as may the level of moisture initially incorporated within the desired ranges. However, in varying these levels the relationship of the water soluble solids in solution to the water should be controlled so as to afford the desired osmotic pressure. A good rule to observe in this connection is to be sure that the water soluble solids available for solution are at least equal to the weight of moisture present, although in some cases it is possible that a lower level of water soluble solids might afford some protection against microbiological decomposition provided an equivalent degree of osmotic pressure is available to protect the product. It will be found, however, that the level of sugar which is employed in the present invention will constitute a major percent by weight of the water soluble solids.

The novel French toast product of this invention, when prepared in the manner disclosed, is characterized by substantially complete resistance to bacterial decomposition, when the moisture level of the French toast ranges from about 14 to 32 percent, and the Aw is between about 0.80 to 0.90; however, as a precautionary measure against the growth of yeast and molds certain antimycotic agents are incorporated in the emulsion at sufficient levels to prevent the growth of such organisms. Sorbate salts such as potassium sorbate as well as sorbic acid can be used either separately or in combination. Propylene glycol which may be used alone or with other humectants like sorbitol to impart a degree of product softness or tenderness has also been found to serve as an antimycotic. Other antimycotic agents will be apparent to those skilled in the art. The amount of antimycotic agent added is selected so as to produce the desired results and will constitute a minor proportion of the product, say from about 0.1 percent to about 2.5 percent of the total weight, depending on the particular antimycotic and the particular product composition, although even lower levels in the order of 50 p.p.m. can be employed in the case of some antimycotics such as pimaricin. Potassium sorbate in a water solution can be sprayed into the surface of the French toast product, or the product can be dipped in this solution; other antimycotics which lend themselves to such surface application are esters of the parabens (para-hydroxy benzoate) such as propyl and methyl parabens (methyl para-hydroxy benzoate). Cellophane and other enwrapments for the food can be spray coated with a sorbic acid solution but impregnation or dusting with sorbic acid or potassium sorbate is preferred. Antimycotics which can generally be used are benzoic acid, sodium benzoates, propionic acid, sodium and calcium propionate, sorbic acid, potassium and calcium sorbate, propylene glycol, diethyl pyrocarbonate, and menadione sodium bisulfite.

The shelf stable French toast is packaged in a non-hermetic container and has the appearance, texture, color and aroma not unlike conventional French toast. When removed from its pouch, the moist and soft product is warmed just prior to consumption using a toaster. The product has a sufficient cohesive strength so that when it is removed from the toaster the toast will not tear nor adhere to the toaster grill. The dry ingredients chosen to produce the balanced shelf stable French toast will preferably include dried egg white, non-fat milk solids, dried egg yolk, common table salt, potassium sorbate, cinnamon powder, white pepper and F.D.C. Yellow No. 5. Non-dry ingredients employed to prepare the shelf stable French toast will include syrups, edible food oils, edible polyhydric alcohols and water.

Sugar contributed by the syrup is the principal source of water soluble solids of the Aw emulsion and may range from about 55 percent to 65 percent of the solution or about 15 percent to 35 percent by weight of the emulsion, depending upon the particular sugar or sugar mixture employed in the syrup to provide the desired bacteriostatic protection. As the moisture content of the product increases in the intermediate moisture range, the level of a given sugar will correspondingly increase in order to maintain a sufficient bacteriostatic effect. The quantity of sugar chosen will also vary depending upon the presence and level of auxiliary water soluble solids which produce a similar increase in osmotic pressure to the Aw emulsion; thus, a variety of low average molecular weight materials may be included as part of the water soluble solids in the Aw emulsion and would have the effect of augmenting the sugars in their role of providing sufficient osmotic pressure to prevent bacterial decomposition of the final French toast product.

Includable among the edible oils which may be used in this invention are the hydrogenated and non-hydrogenated forms of coconut oil, palm kernel oil, cottonseed oil, corn oil, peanut oil, olive oil, sunflower oil, sesame seed oil, safflower oil, poppyseed oil, mixtures thereof, and the like. Butter and margarine may also be employed if desired. Incorporating these oils into the formulation acts to completely prevent any sugar crystallization which might otherwise occur on the surface of the French toast when it is grilled.

The polyhydric alcohols having two or more hydroxyl groups which may be used include glycerol, sorbitol, propylene glycol, mannitol, mixtures thereof, and the like. In general the polyhydric alcohols employed should be of low molecular weight and present in amounts between about 5 percent to 15 percent so as to offer a substantial effect in increasing the osmotic pressure of the Aw emulsion contained in the French toast. These polyhydric alcohols assist in depleting the moisture of the French toast by substituting for a portion of the moisture present in the interior of the product and causing moisture transfer to the exterior thereof.

Following are examples setting forth certain preferred but non-limiting formulations which embody the principles of the invention.

EXAMPLE I

| Ingredients | Parts by Weight | % |
| --- | --- | --- |
| Spray Dried Egg White | 19.10 | 3.64 |
| Spray Dried Egg Yolk | 11.90 | 2.27 |
| Salt | 0.80 | 0.15 |
| Non-Fat Milk Solids | 15.40 | 2.94 |
| Cinnamon Powder | 0.25 | 0.04 |
| White Pepper | 0.20 | 0.03 |
| Glycerin | 75.00 | 14.32 |
| Syrup (66 Brix)* | 200.00 | 38.25 |
| F.D.C. Yellow 05 | 0.05 | 0.01 |
| Cottonseed Oil | 150.00 | 28.65 |
| Water | 50.00 | 9.55 |
| Potassium Sorbate | 0.82 | 0.15 |
| | 523.52 | 0.15 |

*Syrup

| Ingredients | % |
| --- | --- |
| Sucrose Solids | 54.25 |
| Maple Sugar Solids | 6.96 |
| 43° Be Corn Syrup | 5.00 |
| Sodium Benzoate | 0.05 |
| Sorbic Acid | 0.03 |
| Caramel Solids | 0.01 |
| Water | 33.70 |

The dry ingredients were blended into a homogeneous mix and then added to a solution of syrup and water. The mixture is then mixed at low speed for 2 to 3 minutes, whereupon glycerin is added and the entire mixture is further mixed for about 1 ½ minutes at low speed. When almost all the dry blend is dissolved, cottonseed oil is added and the mixture is blended at high speed to produce a uniform emulsion. White bread is then dipped for 2 minutes on each side in the Aw lowering emulsion. The coated bread is then grilled on a griddle (with frequency turning) until a golden brown color develops. The French toast product is allowed to cool to room temperature and is then packaged.

French toast produced by this process usually has a moisture content ranging from 14 to 32 percent, and an Aw ranging from about 0.80 to 0.90. In all cases of microbiological evaluation the product had a maximum standard plate count of 20 and a thermophile count of 10 after storage of seven days at 100°F. One sample produced according to this process was stored for one month at room temperature and was found to have a standard plate count of only 10. These results demonstrate the product's ability to retain its shelf stable quality without the need for sterilization, freezing or refrigeration.

When one slice of fresh bread (weighing about 26 grams) is dipped one and one-half minutes on each side in the Aw emulsion, it picks up about 54 grams of the dip. After the final grilling step the complete French toast weighs about 79.6 grams. When a slice of fresh bread (weighing about 26 grams) is dipped for two minutes on each side in the Aw emulsion, it picks up about 70 grams of the dip. Either procedure produces a uniform penetration from the surface to the center of the bread, thus insuring stability.

In some instances it has been found undesirable in this invention to employ syrup as herein above set forth due to the high cost of maple sugar solids, however, it is nonetheless desirable to have maple-like flavors and yet not incur the expense necessary to provide the same. One means is of course to use artificial maple flavor, however, it has been discovered that when a solution of light brown sugar, sucrose solids, glucose, glycerol, potassium sorbate and caramel color is mixed with dried ingredients comprising egg white, non-fat milk solids and egg yolk to form an Aw emulsion, use of the emulsion on French toast produces a maple-like aroma and taste during the final grilling step. The amount of light brown sugar used in the solution which is mixed with the dried ingredients to form the emulsion, will range between 2 to 12 percent by weight of the solution. Above 12 percent too much caramel or molasses type flavor is produced. Below 2 percent a simple sugar solution flavor is produced. This syrup solution will constitute about 4 percent by weight of the emulsion.

The formulation which produces a maple-like aroma and flavor during the final grilling is as follows:

Syrup Having A Maple-Like Flavor

| Ingredients | % |
| --- | --- |
| Sucrose Solids | 49.07 |
| Glucose (Monohydrate) | 12.53 |
| Brown Sugar (light) | 5.50 |
| Glycerol | 2.71 |
| Potassium Sorbate | 0.28 |

| | |
|---|---|
| Caramel Color | 0.01 |
| Water | 29.90 |
| | 100.00 |

EXAMPLE II

Same as Example I except that instead of using the syrup of Example I, a syrup solution having a maple-like flavor was used in the emulsion.

In both examples the water soluble sugar solids are maintained between 15 percent to 35 percent by weight of the emulsion, and the weight level of water soluble solids is at least equal to or greater than that of the moisture of the emulsion.

Although the invention has been described with reference to specific examples, it will be obvious to those skilled in the art that various other embodiments can be practiced within the scope of this invention.

What is claimed is:

1. A shelf stable French toast product with an Aw between 0.80 and 0.90 and adapted to be packaged in a non-hermetic packaging material without sterilization and stored for long periods of time without refrigeration; said toast having a moisture content between 14 percent to 32 percent by weight, and comprised of bread substantially saturated with an emulsion in which the water soluble sugar solids are between 15 percent to 35 percent by weight of the emulsion, and the weight level of water soluble solids is greater than that of the moisture of the emulsion, said emulsion containing an edible polyhydric alcohol in amounts from about 3 percent to 15 percent by weight of the emulsion and having an effective level of antimycotic to prevent mold growth.

2. The French toast product of claim 1 wherein the emulsion contains an edible oil.

3. The French toast product of claim 1 wherein the emulsion contains non-fat milk solids.

4. A shelf stable French toast product with an Aw between 0.80 and 0.90 and adapted to be packaged in a non-hermetic packaging material without sterilization and stored for long periods of time without refrigeration; and which produces a maple-like flavor upon grilling, said toast having a moisture content between 14 percent to 32 percent by weight, and comprised of bread substantially saturated with an emulsion containing about 40 percent by weight of a solution which contains between 2 percent to 12 percent light brown sugar; the water soluble sugar solids of the emulsion being between 15 percent to 35 percent by weight, and the weight level of water soluble solids in the emulsion being greater than the amount of moisture of the emulsion, said emulsion containing an edible polyhydric alcohol in amounts from about 3 percent to 15 percent by weight of the emulsion and having an effective level of antimycotic to prevent mold growth.

5. The French toast product of claim 4 wherein the emulsion contains an edible oil.

6. The French toast product of claim 4 wherein the emulsion contains non-fat milk solids.

* * * * *

UNITED STATES PATENT OFFICE
CERTIFICATE OF CORRECTION

Patent No. 3,655,404     Dated Apr. 11, 1972

Inventor(s) George Glasser, Frank Hollis, and Milton Kaplow

It is certified that error appears in the above-identified patent and that said Letters Patent are hereby corrected as shown below:

In Column 1, Line 2 insert ---SUMMARY--- underneath "SHELF STABLE FRENCH TOAST".
In Column 3, Line 70 change "F.D.C. Yellow 05" to ---F.D.C. Yellow #5---, Line 75 change "0.15" to ---100.00---, Line 75 insert ---*Syrup--- at the beginning of the line.
In Column 4, Line 1 delete "*Syrup", Line 12 insert ---100.00--- underneath the % column.

Signed and sealed this 24 th day of April 1973.

(SEAL)
Attest:

EDWARD M. FLETCHER, JR.     ROBERT GOTTSCHALK
Attesting Officer           Commissioner of Patents